(12) United States Patent
Kiyohara

(10) Patent No.: US 7,420,630 B2
(45) Date of Patent: Sep. 2, 2008

(54) DISPLAY DEVICE WITH CASE HAVING A HOOK PORTION

(75) Inventor: Toru Kiyohara, Kikuchi-gun (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 373 days.

(21) Appl. No.: 11/384,261

(22) Filed: Mar. 21, 2006

(65) Prior Publication Data

US 2006/0268189 A1 Nov. 30, 2006

(30) Foreign Application Priority Data

May 24, 2005 (JP) ............................. 2005-150538

(51) Int. Cl.
*G02F 1/1333* (2006.01)
*G02F 1/1335* (2006.01)
*G02F 1/1345* (2006.01)

(52) U.S. Cl. ............................. 349/58; 349/62; 349/149

(58) Field of Classification Search .................. 349/58, 349/59, 60
See application file for complete search history.

(56) References Cited

U.S. PATENT DOCUMENTS 5,182,660 A * 1/1993 Tanaka ......................... 349/65

6,388,722 B1 * 5/2002 Yoshii et al. ................... 349/62

FOREIGN PATENT DOCUMENTS

| JP | 2000-258753 | 9/2000 |
| JP | 2003-107432 | 4/2003 |
| JP | 2003-279932 | 10/2003 |

* cited by examiner

*Primary Examiner*—Michael H Caley
(74) *Attorney, Agent, or Firm*—Oblon, Spivak, McClelland, Maier & Neustadt, P.C

(57) ABSTRACT

According to the present invention, because a display panel is robustly held in a case, a narrow-frame and thin display device can be obtained even in the case where hook portions that hook the first substrate are enlarged. Moreover, a display device having raised assembly workability can be obtained in which, when the display panel is fit to the frame, the hook portions do not obstruct the insertion of the display panel. A first substrate (7) of a display panel (6) has on only one edge thereof an extension portion (12) that protrudes beyond a lateral endface (8a) of a second substrate (8) and provides an area on which terminals (11) for inputting an external video signal are formed; a hook portion (13) of a case (3) that holds the display panel (6) hooks the extension portion (12); and an adhesion portion (14) for adhering a planar-light-source device (5) to the display panel (6) is provided at the peripheral portion (7a) of at least one edge, excluding the edge hooked by the hook portion (13), among the peripheral portions in a bottom side (7c) of the first substrate (7).

8 Claims, 5 Drawing Sheets

DISPLAY DEVICE WITH CASE HAVING A HOOK PORTION

BACKGROUND OF THE INVENTION

1. Field of the Invention

The present invention relates to display devices having a display panel formed of two substrates opposing each other.

2. Description of the Related Art

In a conventional liquid-crystal display device, an extension portion is formed at one end, of the device, opposite to the other end at which hook portions of a support are provided; the bottom side of the extension portion is adhered through a strip of two-sided adhesive tape to a fixing-surface portion provided on the top side of a light guide plate (refer to, e.g., Japanese Laid-Open Patent Publication No. 2000-258753: 1.16 in the left column to 1.21 in the right column in p. 5, and FIGS. 1 and 2).

Additionally, when a liquid-crystal display panel is disposed in a case, a hook portion hooks the top side of the extension portion of a lower-glass substrate of the liquid-crystal display panel (refer to, e.g., Japanese Laid-Open Patent Publication No. 2003-279932: 1.40 in the left column to 1.1 in the right column in p. 3, and FIG. 4).

SUMMARY OF THE INVENTION

In a conventional liquid-crystal display device disclosed in Japanese Laid-Open Patent Publication No. 2000-258753, the extension amount of each of hook portions is limited so as not to cover a polarization plate attached on the top side of a transparent substrate; however, in order to firmly hold a liquid-crystal display panel to a support, the respective areas (a frame area where the polarization plate is not attached to the transparent substrate) of the hook portions that hook the transparent substrate are required to be enlarged. In consequence, difficulty in narrowing the frame of the liquid-crystal display device has been a problem.

Moreover, because the thickness of the hook portions that hook the top side of the transparent substrate situated on the display-screen side increases the thickness of the entire liquid-crystal display device, it has been a problem that reduction of thickness is difficult.

Still moreover, a conventional liquid-crystal display device disclosed in Japanese Laid-Open Patent Publication No. 2003-279932 has a structure in which a lower-glass substrate includes a pair of extension portions extending beyond the respective opposite sides of the liquid-crystal display panel, and a plurality of hook portions hook the extension portions, of the lower-glass substrate, that are opposing each other; therefore, when the liquid-crystal display panel is fit to the frame, the hook portions become obstructions to the insertion of the liquid-crystal display panel, whereby it has been a problem that assembly workability is deteriorated.

Furthermore, when the liquid-crystal display panel is fit to the frame, depending on the adjustment of force applied to the liquid-crystal display panel, the force applied by way of the top side of the liquid-crystal display panel converges on the hook portion, whereby, for example, it has been a problem that cracks occur in the glass substrate.

The present invention has been implemented in order to address the issues described above, and its prime object is to obtain a narrow-frame liquid-crystal display device even when, in order to firmly hold to the support the liquid-crystal display panel, the area of the hook portion that hooks the transparent substrate is enlarged.

Moreover, the second object is to obtain a thin liquid-crystal display device, without making the thickness of the hook portions that hook liquid-crystal display panel increase the entire thickness of the liquid-crystal display device.

Still moreover, the third object is to obtain a liquid-crystal display device, having raised assembly workability, in which the hook portions are not obstructions to the insertion of a liquid-crystal display panel when the liquid-crystal display panel is fit to the frame.

In a display device according to the present invention, a first substrate of a display panel has on only one edge thereof an extension portion that protrudes beyond the lateral endface of a second substrate and provides an area on which terminals for inputting an external video signal are formed; a hook portion of a case that holds the display panel hooks the extension portion; and an adhesion portion for adhering a planar-light-source device to the display panel is provided at the peripheral portion of at least one edge, excluding the edge hooked by the hook portion, among the peripheral portions of the bottom side of the first substrate.

According to the present invention provides a control system, because a first substrate of a display panel has on only one edge thereof an extension portion that protrudes beyond the lateral endface of a second substrate and provides an area on which terminals for inputting an external video signal are formed, a hook portion of a case that holds the display panel hooks the extension portion, and an adhesion portion for adhering a planar-light-source device to the display panel is provided at the peripheral portion of at least one side, excluding the edge hooked by the hook portion, among the peripheral portions of the bottom side of the first substrate, the display panel is robustly held in a case; therefore, a narrow-frame and thin display device can be obtained even in the case where hook portions that hook the first substrate are enlarged. Moreover, without making the thickness of the hook portions that hook display panel increase the entire thickness of the liquid-crystal display device, a thin display device can be obtained. Still moreover, a display device having raised assembly workability can be obtained in which, when the display panel is fit to the frame, the hook portions do not obstruct the insertion of the display panel.

DETAILED DESCRIPTION OF THE PREFERRED EMBODIMENTS

Embodiment 1

Figure 1:
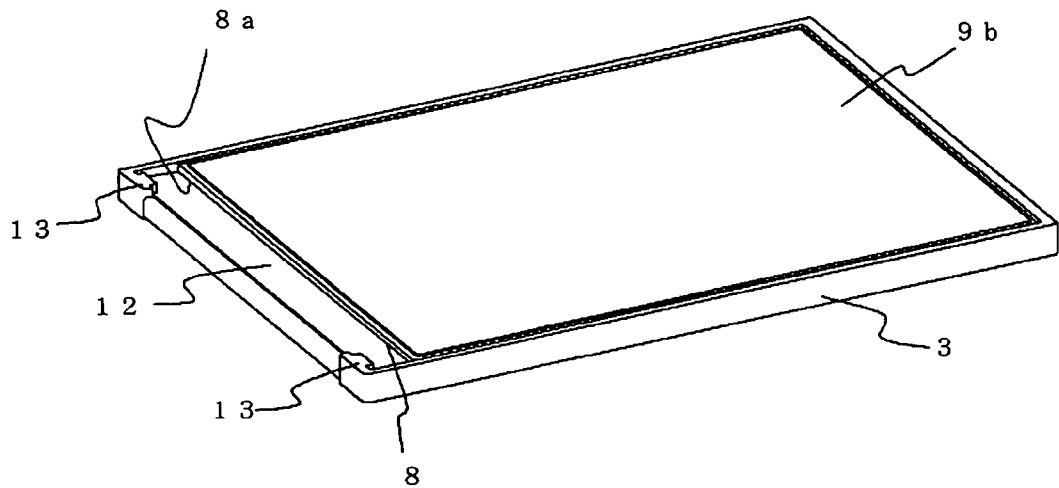
FIG. 1 is a perspective view schematically illustrating the structure of a display device according to Embodiment 1 of the present invention.
Figure 2:
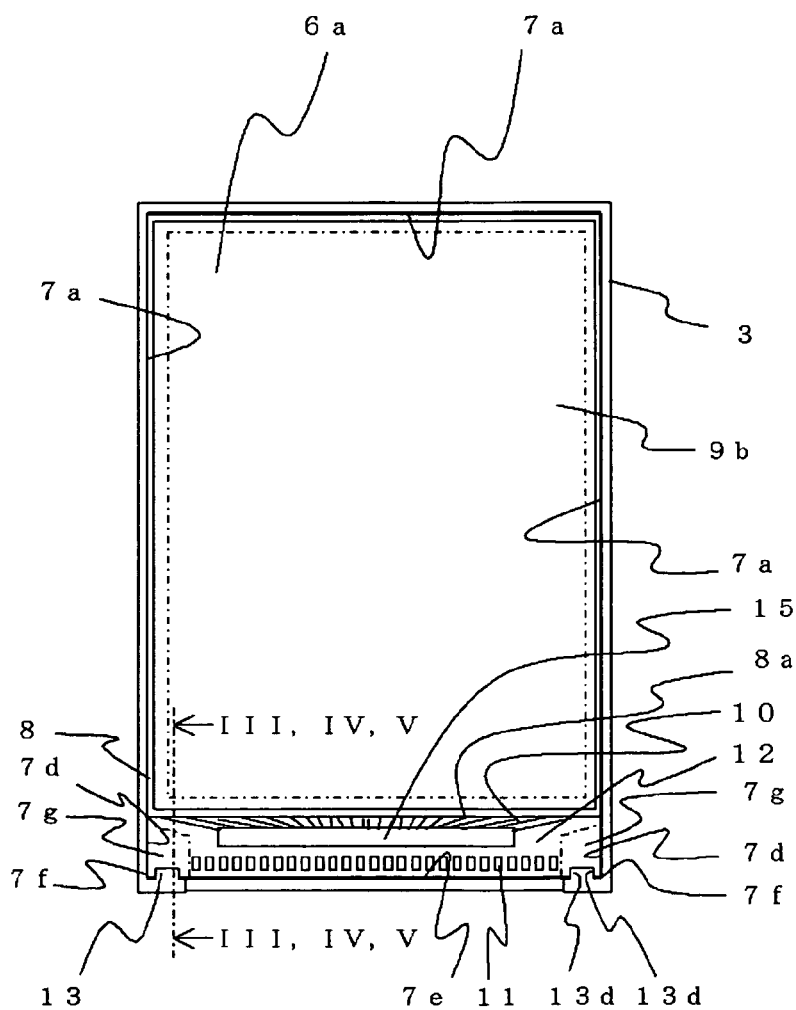
FIG. 2 is a plan view schematically illustrating the structure of a display device according to Embodiment 1 of the present invention.
Figure 3:
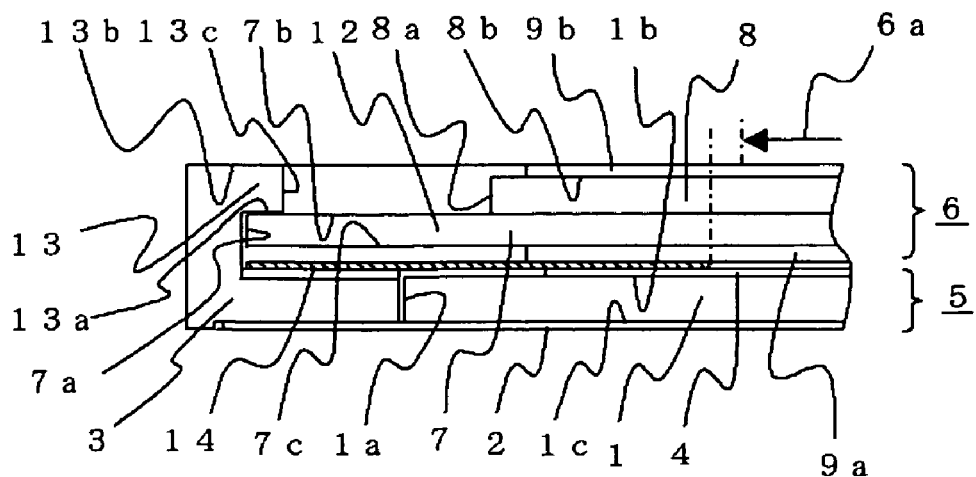
FIG. 3 is a partial cross-sectional view of the display device illustrated in FIG. 2, taken along the line III-III.
Figure 4:
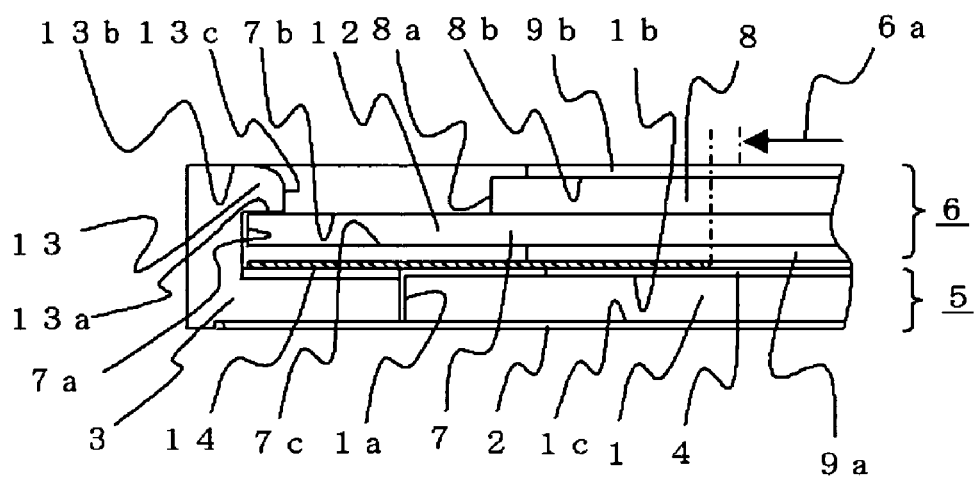
FIG. 4 is a partial cross-sectional view illustrating the shape of another hook portion of the display device illustrated in FIG. 2, taken along the line IV-IV.
Figure 5:
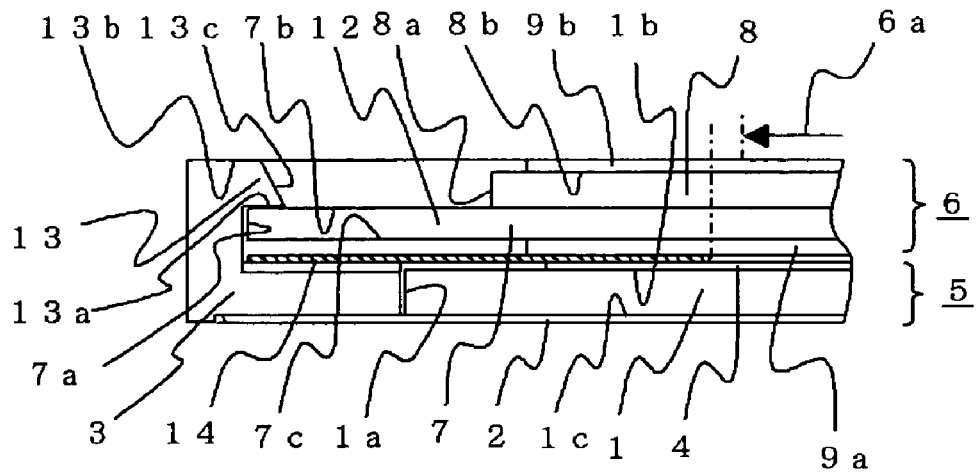
FIG. 5 is a partial cross-sectional view illustrating the shape of further another hook portion of the display device illustrated in FIG. 2, taken along the line V-V.

FIG. 1 is a perspective view schematically illustrating the structure of a display device according to Embodiment 1 for implementing the present invention; FIG. 2 is a plan view schematically illustrating the structure of a display device according to Embodiment 1 for implementing the present invention; FIG. 3 is a partial cross-sectional view of the display device illustrated in FIG. 2, taken along the line III-III; FIG. 4 is a partial cross-sectional view illustrating the shape of another hook portion of the display device illustrated in FIG. 2, taken along the line IV-IV; and FIG. 5 is a partial cross-sectional view illustrating the shape of further another hook portion of the display device illustrated in FIG. 2, taken along the line V-V.

In FIGS. 1 to 5, an unillustrated light source is arranged in the vicinity of at least one lateral face 1a of the lateral faces of a light guide plate 1, and light exiting from the light source is made to enter the light guide plate 1, through the lateral face 1a situated in the vicinity of the light source. The light guide plate 1 transmits light from the light source to emit the light from a top side 1b opposing the display-screen side.

As the light source, linear light sources such as a cold-cathode tube, and point light sources such as a light emitting diode (referred to as LED, hereinafter) and a laser diode (LD) are enumerated. LEDs include a red LED that luminesces red-color (R) light, a green LED that luminesces green-color (G) light, and a blue LED that luminesces blue-color (B) light; by mixing R, G, and B, white-color light can also be obtained.

The light guide plate 1 is a resin plate such as a polyethylene terephthalate (PET), a polymethyl methacrylate (PMMA), a polycarbonate (PC), or a cycloolefin system, or such as a glass substrate, that has a light-transmission function and a refraction index of approximately 1.4 to approximately 1.6. In particular, it is preferable to utilize a polycarbonate resin or a cycloolefin-system resin, because, in consequence, dimensional variation of the light guide plate 1 due to temperature variation is reduced, whereby the light guide plate 1 can be utilized over a wider temperature range.

Inside a case 3, the light guide plate 1 and a reflection sheet 2 are disposed in such a way that the reflection sheet 2, which makes rays that exit from other sides of the light guide plate 1 than the top side 1b reenter the light guide plate 1, adjoins the bottom side 1c and the lateral face 1a of the light guide plate 1.

The reflection sheet 2 is formed of a mixture of a polypropylene (PP) or a polyethylene terephthalate (PET) and a barium sulfate or a titanium oxide, a resin having microscopic air bubbles, a silver-plated metal plate, or a metal plate coated with a paint including a titanium oxide.

In addition, it is preferable that the reflectance of the reflection sheet 2 is 90% or higher so that the reflection loss at the reflection surface is suppressed. Moreover, the case 3 is formed of a synthetic resin such as a polycarbonate (PC) or ABS; it is preferable to prepare a reflective material for the case 3, or to coat a white paint over the inner wall of the case 3, so as to raise the reflectance of the case 3, because, in consequence, the reflection inside the case 3 is further enhanced, whereby losses of rays emitted from the light source are reduced. Still moreover, it is preferable to make the case 3 play the role of the reflection sheet 2, because, in consequence, the number of members can be reduced.

On the light guide plate 1, a group of optical sheets 4 for effectively utilizing light are arranged; a liquid-crystal display panel described later is arranged through the group of optical sheets 4 on the light guide plate 1.

In addition, the group of optical sheets 4 is configured of a lens sheet sandwiched between diffusion sheets. Moreover, when the enhancement of brightness is required, a plurality of lens sheets may be combined, with the orientation of prisms formed on each of the lens sheets being considered. Still moreover, in the case where usibility is raised, two or more diffusion sheets may be utilized. Furthermore, depending on the light-distribution characteristics of the lens sheet, only one lens sheet may be utilized, or no lens sheet may be utilized. Moreover, a protection sheet, a lens sheet, and a polarization-reflection sheet may be combined. Still moreover, no optical sheet may be utilized; it is preferable to implement optimization for the combination of the group of the sheets 4, with required brightness and light-distribution characteristics being considered.

As discussed above, by making the case 3 contain an unillustrated light source, an unillustrated lamp reflector, the light guide plate 1, the reflection sheet 2, and the group of optical sheets 4, a planar-light-source device 5 is configured that emits in a planar shape light emitted from a point light source or a linear light source, toward the display-screen side.

As a display panel 6 disposed on the planar-light-source device 5, a liquid-crystal display panel that utilizes the birefringence property of a liquid crystal and a print obtained by printing characters and pictures on a transparent plate are enumerated; in Embodiment 1, as a display panel 6, a liquid crystal display panel is utilized.

The display panel 6 is formed of a rectangular first substrate 7 situated on the planar-light-source device 5 side, and a second substrate 8 that opposes the first substrate 7 and is situated on the display-screen side.

In particular, the liquid-crystal display panel is configured of a TFT array substrate in which, on an insulating glass substrate as the first substrate 7, thin film transistors (referred to as TFT, hereinafter) to be switching elements, electrodes such as pixel electrodes, conducting wires, and the like are formed, a color filter substrate (referred to as a CF substrate, hereinafter) in which, on a glass substrate as the second substrate 8, colored layers and the like are formed, a spacer for maintaining the first substrate 7 and the second substrate 8 spaced evenly apart from each other, a sealing material for attaching the first substrate 7 to the second substrate 8, a sealant for sealing in a liquid crystal filled between the first substrate 7 and the second substrate 8, an oriented film for initially orienting the liquid crystal, a first polarization plate 9a and a second polarization plate 9b disposed on the bottom side 7c of the first substrate 7 and on the top side 8b of the second substrate 8, respectively, and the like; however, because, in Embodiment 1, an existing liquid-crystal display panel is utilized, detailed explanation will be omitted.

In addition, in the liquid-crystal display panel, the first substrate 7 has a region that does not overlap the second substrate 8 on which terminals 11 are formed, outgoing wires 10 drawn out from the conducting wires on the first substrate 7 within a display area 6a to the outside of the display area 6a being connected at the terminals 11 with respective external circuits.

In Embodiment 1, an extension portion 12, of the first substrate 7, that is a region that does not overlap the second substrate 8 and protrudes outward beyond a lateral face 8a of the second substrate 8, exists only on one edge of the first substrate 7.

Moreover, the extension portion 12 has two first peripheral portions 7d opposing each other, of the top side 7b of the first substrate 7, and a second peripheral portion 7e adjacent to the two first peripheral portions 7d opposing each other; the first peripheral portion 7d and the second peripheral portion 7e form a corner portion 7f.

Still moreover, in addition to the area on which the outgoing wires 10 and the terminals 11 are formed, the extension portion 12 has avoidance areas 7g that do not overlap the outgoing wires 10 and the terminals 11; in Embodiment 1, the outgoing wires 10 and the terminals 11 are arranged in such a way that the avoidance areas 7g are in the vicinity of the respective corner portions 7f.

Furthermore, on the bottom side 7c of the first substrate 7, adhesion portions 14 for adhering the display panel 6 to the planar-light-source device 5 are provided at peripheral portions 7a of the four edges as the peripheral portion, in such a way as to surround the display area 6a. As the adhesion portion 14, a two-sided adhesive tape and other adhesives are enumerated.

Two-sided adhesive tapes are formed of a synthetic resin such as a polyethylene terephthalate (PET); by utilizing a black two-sided adhesive tape, it is possible to efficiently cut off unnecessary rays among rays emitted from the planar-light-source device 5, whereby the display quality of the display device can be improved. Moreover, by utilizing a white or silver-color two-sided adhesive tape, it is possible to recycle rays that would be reflected diffusively and dissipated, at the peripheral portion of the display area; therefore, the luminance of the planar-light-source device 5 can be raised.

In addition, in Embodiment 1, the first polarization plate 9a is disposed in such a way as to cover the display area 6a of the display panel 6 and the 2 mm-wide area surrounding the display area 6a. Moreover, the two-sided adhesive tape as the adhesion portion 14 occupies a region ranging from the peripheral portion 7a of the first substrate 7 to a position that is on the first polarization plate 9a and do not cover the display area 6a, and adheres the display panel 6 to the group of optical sheets 4 in the planar-light-source device 5.

Still moreover, in the case 3, hook portions 13 that hook the top side 7b of the first substrate 7; in Embodiment 1, by making two hook portions 13, i.e., respective portions of the case 3, extending from the second peripheral portions 7e, hook the two avoidance areas 7g in the extension portion 12, the display panel 6 is held.

The hook portion 13 has a hooking face 13a abutting the top side 7b of the first substrate 7 and a extending portion extending from the case 3 toward the display area 6a; in Embodiment 1, as illustrated in FIGS. 2 and 3, the extending face is formed of a top side 13b opposing the hooking face 13a, an insertion face 13c opposing the lateral face 8a of the second substrate 8, and two lateral faces 13d that are opposing each other and perpendicular to the top side 13b and the insertion face 13c.

In addition, the thickness of the hook portion 13, i.e., the space between the hooking face 13a and the top side 13b is set in such a way that the height of the hook portion 13, i.e., the height of the top side 13b of the hook portion 13 is the same as or lower than that of the top side of the second polarization plate 9b disposed on the top side 8b of the second substrate 8.

For instance, if the thicknesses of the second substrate 8 and the second polarization plate 9b are approximately 0.5 mm and approximately 0.3 mm, respectively, the thickness of the hook portion 13 can be set to approximately 0.8 mm. As described above, while having the strength enough to hold the display panel 6 and securely and robustly holding the display panel 6, the hook portion 13 can have a height the same as or lower than that of the top side of the second polarization plate 9b; therefore, the display apparatus can be thinned.

Moreover, the hook portion 13 abuts only the extension portion 12; therefore, the hook portion 13 never overlaps the first polarization plate 9a and the second polarization plate 9b. Therefore, the space between the peripheral portion of the first polarization plates 9a and the first substrate 7 and the space between the second polarization plate 9b and the second substrate 8 can be narrowed, a display device having a narrow frame can be obtained.

When the display panel 6 is inserted into the case 3, because, by inserting the display panel 6 under the hooking face 13a of the hook portion 13, from the edge opposite to the edge at which the hook portions 13 in the case 3 extend, and then making the display panel 6 abut the two-sided adhesive tape on the planar-light-source device 5, the hook portion 13 does not obstruct the insertion of the display panel 6; therefore, assembly workability can be improved.

In addition, as illustrated in FIG. 4, the corner portion may be chamfered that is a portion where the top side 13b and the insertion face 13c of the hook portion 13 adjoin each other, or, as illustrated in FIG. 5, the corner portion may be chamfered in such a way that the insertion face 13c to be formed from the top side 13b toward the display area 6a is slanted with respect to the top side 13b.

Accordingly, in the case where the display panel 6 is inserted into the case 3, perpendicularly to the top side 1b of the light guide plate 1, the display panel 6 can be fit to the case 3, while abutting the portion, of the case 13, ranging from the insertion face 13c to the hooking face 13a; therefore, assembly workability can be improved. Moreover, in the case of the insertion of the display panel 6, the occurrence of foreign materials due to the friction between the display panel 6 and the hook portion 13 can be suppressed, whereby defects due to foreign materials, such as defective display through the display panel, can be suppressed.

In addition, in Embodiment 1, the adhesion portions 14 are provided at four edges that are peripheral portions of the first substrate 7; it is preferable that, because, by providing the adhesion portion 14 at the peripheral portion 7a of at least one edge, excluding the edge hooked by the hook portion 13, among the peripheral portions in the bottom side of the first substrate 7, both the hook portion 13 and the adhesion portion 14 can limit the vertical shift of the display panel 6, compared with the case where the adhesion portion 14 and the hook portion 13 are provided only the same edge.

In this situation, as illustrated in FIG. 3, because, along the extension portion 12 of the display panel 6, the first polarization plate 9a does not exist on the first substrate 7, a level difference corresponding to the thickness of the first polarization plate 9a occurs, whereby the two-sided adhesive tape can not exert sufficient adhesive power to adhere the display panel 6 to the planar-light-source device 5. Accordingly, because, along the extension portion 12 of the display panel 6, a space between the case 3 or the planar-light-source device 5 and the display panel 6 is likely to occur, for example, it has been a problem that abnormal display due to light leakage or the like occurs. However, in Embodiment 1, because, even along the extension portion 12 where sufficient adhesive power cannot be obtained, the hooking face 13a of the hook portion 13 can abut and hook the top side 7b of the first substrate 7, the display panel 6 can stably be held inside the case 3.

In addition, a circuit board including circuitry or an IC that drives the display panel 6 consists of an IC chip 15 and the like are directly mounted on a flexible board connected with the display panel 6 or on the first substrate 7; as may be necessary, another circuit board is further arranged around the IC chip 15 and the like directly mounted on the flexible board or the first substrate 7.

Additionally, a flexible printed circuit (referred to as a FPC, hereinafter), a tape carrier package (referred to as a TCP, hereinafter), and the like are connected with the terminals 11 on the first substrate 7, and a video signal is inputted to the display panel 6. Respective rays from the planar-light-source device 5 reach the display panel 6 and then are modulated in accordance with the video signal to render R, G, and B colors.

As described above, a display device is configured by providing a circuit board for driving the display panel 6, arranging the display panel 6 on the planar-light-source device 5, and retaining them inside the case 3.

As described heretofore, in the display device according to Embodiment 1, because the adhesion portions 14 and the hook portions 13 are disposed so that the first substrate 7 of the display panel 6 is held, a display device can be obtained in which neither rise, of the display panel 6, at the extension portion 12 thereof nor a space between the planar-light-source device 5 and the display panel 6 occurs. Moreover, a thin display device can be obtained that can be readily produced.

Embodiment 2

Figure 6:
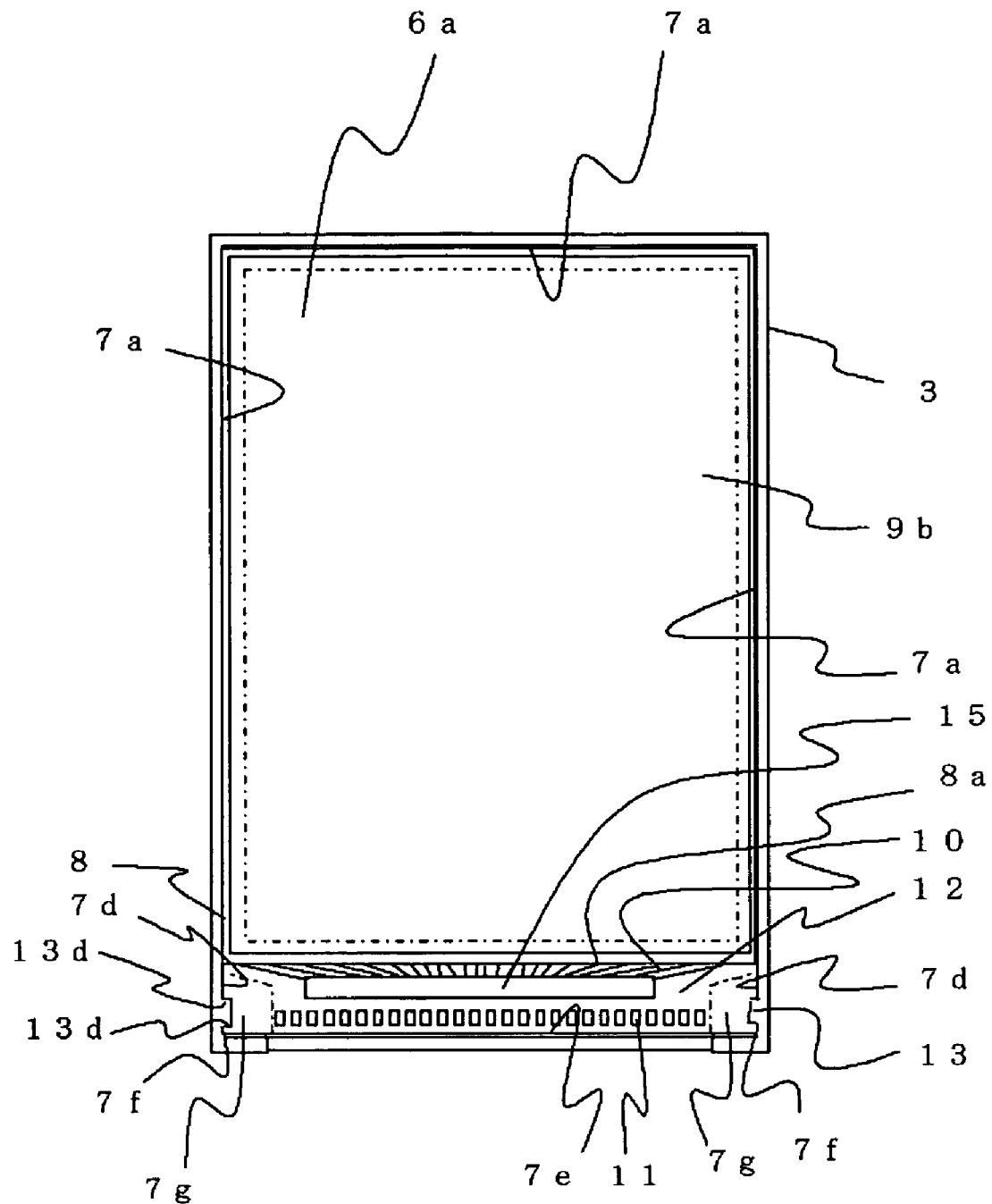
FIG. 6 is a plan view schematically illustrating the structure of a display device according to Embodiment 2 of the present invention.
Figure 7:
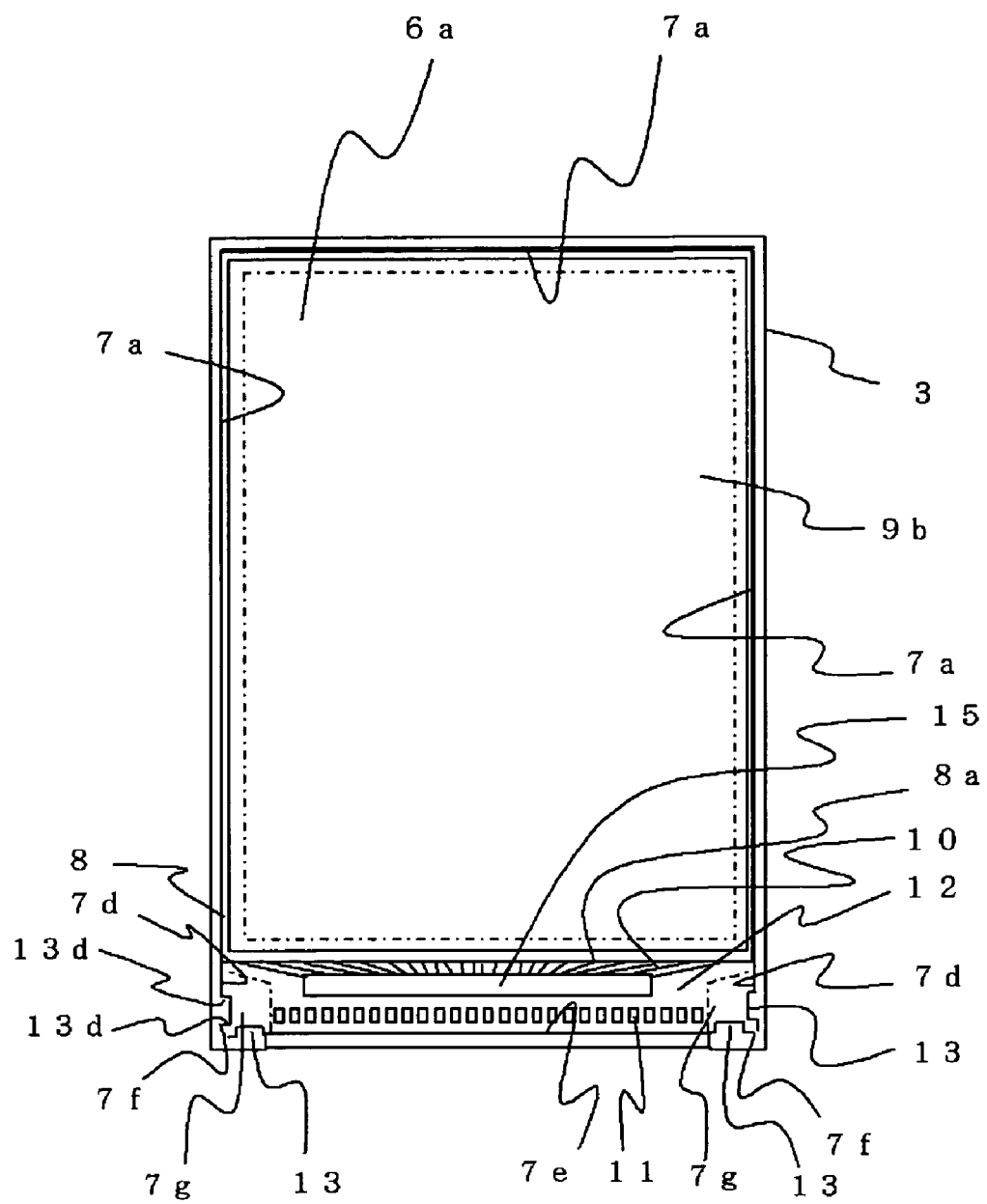
FIG. 7 is a plan view illustrating another arrangement of hook portions of the display device illustrated in FIG. 6.
Figure 8:
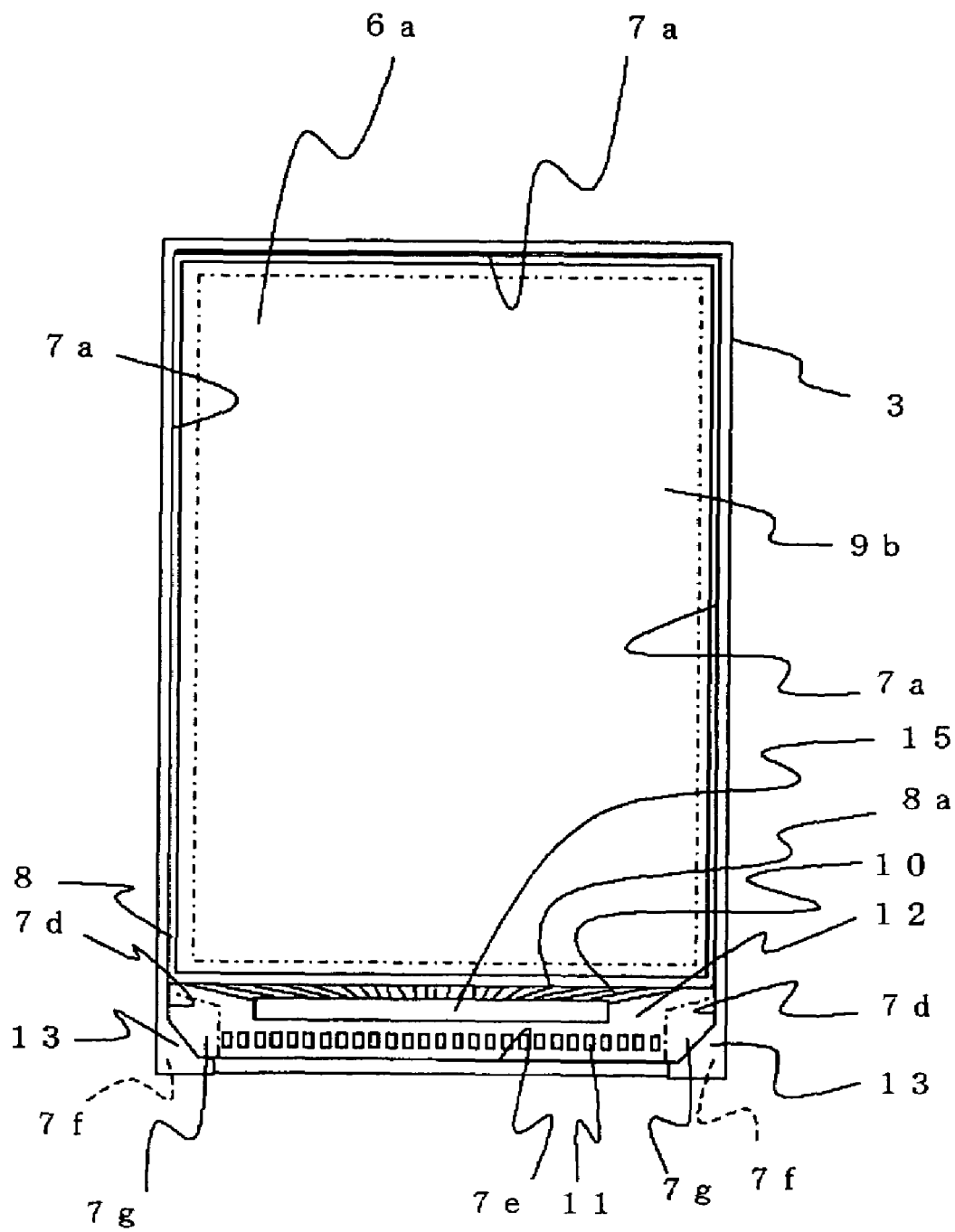
FIG. 8 is a plan view illustrating further another arrangement of hook portions of the display device illustrated in FIG. 6.

FIG. 6 is a plan view schematically illustrating the structure of a display device according to Embodiment 2 of the present invention; FIG. 7 is a plan view illustrating another arrangement of hook portions of the display device illustrated in FIG. 6; and FIG. 8 is a plan view illustrating further another arrangement of hook portions of the display device illustrated in FIG. 6. In FIGS. 6 and 8, the same reference marks as those in FIGS. 1 to 5 designate the same or equivalent constituent elements, and explanations therefor will be omitted.

Embodiment 2 is the same as Embodiment 1, except that the hook portion 13 is provided in the first peripheral portion 7*d*, and demonstrates the same operation and effect as those of Embodiment 1, except for the operation and effect, of the hook portion 13, described later.

In some display devices, a case may occur where, with the second peripheral portion 7*e* of the first substrate 7 exposed off the side of the case 3, the display panel 6 is disposed inside the case 3, the terminals 11 are formed in the vicinity of the second peripheral portion 7*e* and connected with a FPC or the like.

In Embodiment 2, as illustrated in FIG. 6, by providing the hook portion 13 in the first peripheral portion 7*d*, the terminals 11 can be arranged in such a way as not to narrow the terminal areas, for connecting a FPC, in the vicinity of the second peripheral portion 7*e* of the first substrate 7.

Moreover, as illustrated in FIG. 7, by providing the respective hook portions 13 in the first peripheral portions 7*d* and the second peripheral portions 7*e*, the entire area of the hook portions 13 that hook the first substrate 7 can be enlarged without changing the respective original shapes of the hook portions 13 provided in the first peripheral portions 7*d* and the second peripheral portions 7*e*; therefore, the display panel 6 can more robustly be fixed while thinness of the display device and narrowness of the frame being maintained.

Still moreover, as illustrated in FIG. 8, by providing the hook portions 13 in such a shape as to hold the corner portions 7*f* of the first substrate 7, the area that hooks the display panel 6 can readily be enlarged.

Furthermore, by inserting the corner portions 7*f* of the first substrate 7 under the hook portions 13 that is provided in the case 3 itself, the display panel 6 can be fixed the case 3; thus, the display panel 6 can more robustly be held, and assembly workability can be improved.

What is claimed is:

1. A display device comprising:
    a planar-light-source device for transmitting light from a light source toward the display device's display screen;
    a display panel made up of a rectangular first substrate situated alongside the planar-light-source device and a second substrate opposing the first substrate and situated alongside the display screen;
    an adhesion portion for, along peripheral portions of the bottom side of the first substrate, adhering the display panel to the planar-light-source device; and
    a case, for holding the display panel, in which a hook portion for hooking the top side of the first substrate is provided, wherein the first substrate has on only one edge thereof an extension portion that protrudes beyond the lateral endface of the second substrate and provides an area on which terminals for inputting an external video signal are formed, the hook portion hooks the extension portion, and the adhesion portion is provided at the peripheral portion of at least one edge, excluding the edge hooked by the hook portion, among the peripheral portions of the bottom side of the first substrate.

2. The display device according to claim 1, wherein the hook portion hooks an avoidance area that is within the extension portion and does not overlap conducting wires and the terminals.

3. The display device according to claim 2, wherein the avoidance area is in the vicinity of a corner portion of the top side of the first substrate.

4. The display device according to claim 3, wherein the extension portion includes two first peripheral portions, opposing each other, of the top side of the first substrate, and a second peripheral portion, the first peripheral portion and the second peripheral portion forming the corner portion, and the hook portion is provided on the second peripheral portion.

5. The display device according to claim 4, wherein the extension portion includes two first peripheral portions, opposing each other, of the top side of the first substrate, and a second peripheral portion, the first peripheral portion and the second peripheral portion forming the corner portion, and the hook portion is provided on the first peripheral portion.

6. The display device according to claim 5, wherein the hook portion is provided on the corner portion.

7. The display device according to claim 3, wherein the extension portion includes two first peripheral portions, opposing each other, of the top side of the first substrate, and a second peripheral portion, the first peripheral portion and the second peripheral portion forming the corner portion, and the hook portion is provided on the first peripheral portion.

8. The display device according to claim 7, wherein the hook portion is provided on the corner portion.

* * * * *